(12) United States Patent  
Neilson

(10) Patent No.: US 6,996,343 B2  
(45) Date of Patent: Feb. 7, 2006

(54) DISPERSION COMPENSATOR

(75) Inventor: David T. Neilson, Old Bridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/394,359

(22) Filed: Mar. 21, 2003

(65) Prior Publication Data

US 2004/0184153 A1    Sep. 23, 2004

(51) Int. Cl.  
*H04J 4/00* (2006.01)  
*H04J 14/00* (2006.01)

(52) U.S. Cl. .................. 398/84; 398/87; 398/81; 359/566; 385/37

(58) Field of Classification Search .............. 359/566, 359/569; 398/147, 148, 149, 150, 81, 84, 398/87, 82; 385/10, 27, 37, 24; 372/102  
See application file for complete search history.

(56) References Cited

U.S. PATENT DOCUMENTS

| | | | | |
|---|---|---|---|---|
| 6,081,543 A * | 6/2000 | Liu et al. | ..................... | 372/102 |
| 6,296,361 B1 | 10/2001 | Shirasaki et al. | ........... | 359/868 |
| 6,481,861 B2 | 11/2002 | Cao et al. | .................. | 359/868 |
| 6,556,320 B1 * | 4/2003 | Cao | ........................... | 398/65 |
| 6,654,516 B2 * | 11/2003 | So | .............................. | 385/27 |
| 2002/0186438 A1 * | 12/2002 | Morozov et al. | .......... | 359/161 |

* cited by examiner

Primary Examiner—Audrey Chang

(57) ABSTRACT

A dispersion compensator having relatively uniform transmission characteristics over the bandwidth of a communication channel. The compensator is designed to process an optical signal corresponding to the communication channel by decomposing that signal into spectral components, routing different components along different optical paths that impart relative delays between the components, and recombining the delayed components spatially and directionally to generate a processed optical signal with reduced chromatic dispersion. In one embodiment, the compensator includes a diffraction grating optically coupled to a mirror array, in which different mirrors receive light corresponding to different communication channels. For each channel, a desired group delay value is produced by selecting the curvature of the corresponding mirror. A compensator employing independently addressable, variable-curvature mirrors enables generation of variable, channel-specific group delays. A representative compensator of the invention can be designed to generate variable group delays between about +400 and −400 ps/nm while maintaining transmission band uniformity of better than about ±0.4 dB over a channel bandwidth of about 60 GHz.

22 Claims, 6 Drawing Sheets

US 6,996,343 B2

DISPERSION COMPENSATOR

BACKGROUND OF THE INVENTION

1. Field of the Invention

The present invention relates to optical communication equipment and, more specifically, to reducing effects of chromatic dispersion (CD).

2. Description of the Related Art

Chromatic dispersion (CD) occurs in an optical fiber as a result of the variation of the index of refraction with wavelength. Due to chromatic dispersion, different spectral components of an optical signal travel in a fiber at different speeds and arrive at the receiver with a group delay. As a result, optical pulses corresponding to optical bits may be significantly distorted and cause errors at the receiver. Chromatic dispersion is well known to severely impair transmission of optical signals at relatively high bit rates (e.g., 40 Gb/s) over relatively large distances (e.g., 1000 km).

Several techniques have been proposed to date to mitigate the effects of chromatic dispersion in optical communication systems. Typically, a device known as a dispersion compensator is deployed at the receiver end of a fiber transmission link to improve the chances that the receiver correctly decodes CD-distorted optical bits. One approach to designing a dispersion compensator is to use one or more gratings for signal processing. During such processing, an optical signal is spectrally decomposed into the corresponding beams that are then routed along different optical paths to generate group delay. Disadvantageously however, in prior art dispersion compensators, the delayed beams arriving at the output of the compensator are typically spatially separated and/or directionally diverse. As a result, prior art dispersion compensators induce optical signal losses that are non-uniform over the bandwidth of a typical optical communication channel. This non-uniformity may cause additional distortion of optical pulses and further errors at the receiver.

SUMMARY OF THE INVENTION

The problems in the prior art are addressed, in accordance with the principles of the present invention, by a dispersion compensator designed to recombine, spatially and directionally, variously delayed spectral components of an optical signal to generate a processed optical signal with reduced chromatic dispersion. As a result, dispersion compensators of the invention have relatively uniform transmission characteristics over the bandwidth of a communication channel.

In one embodiment, the compensator includes a diffraction grating operating in reflection and optically coupled to a mirror array, in which different mirrors receive light corresponding to different communication channels. For each channel, a desired group delay value is produced by selecting the curvature of the corresponding mirror. A compensator employing independently addressable, variable-curvature mirrors enables generation of variable, channel-specific group delays.

In an alternative embodiment, the compensator includes two diffraction gratings operating in transmission and optically coupled to a lens array, in which different lenses receive light corresponding to different communication channels.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
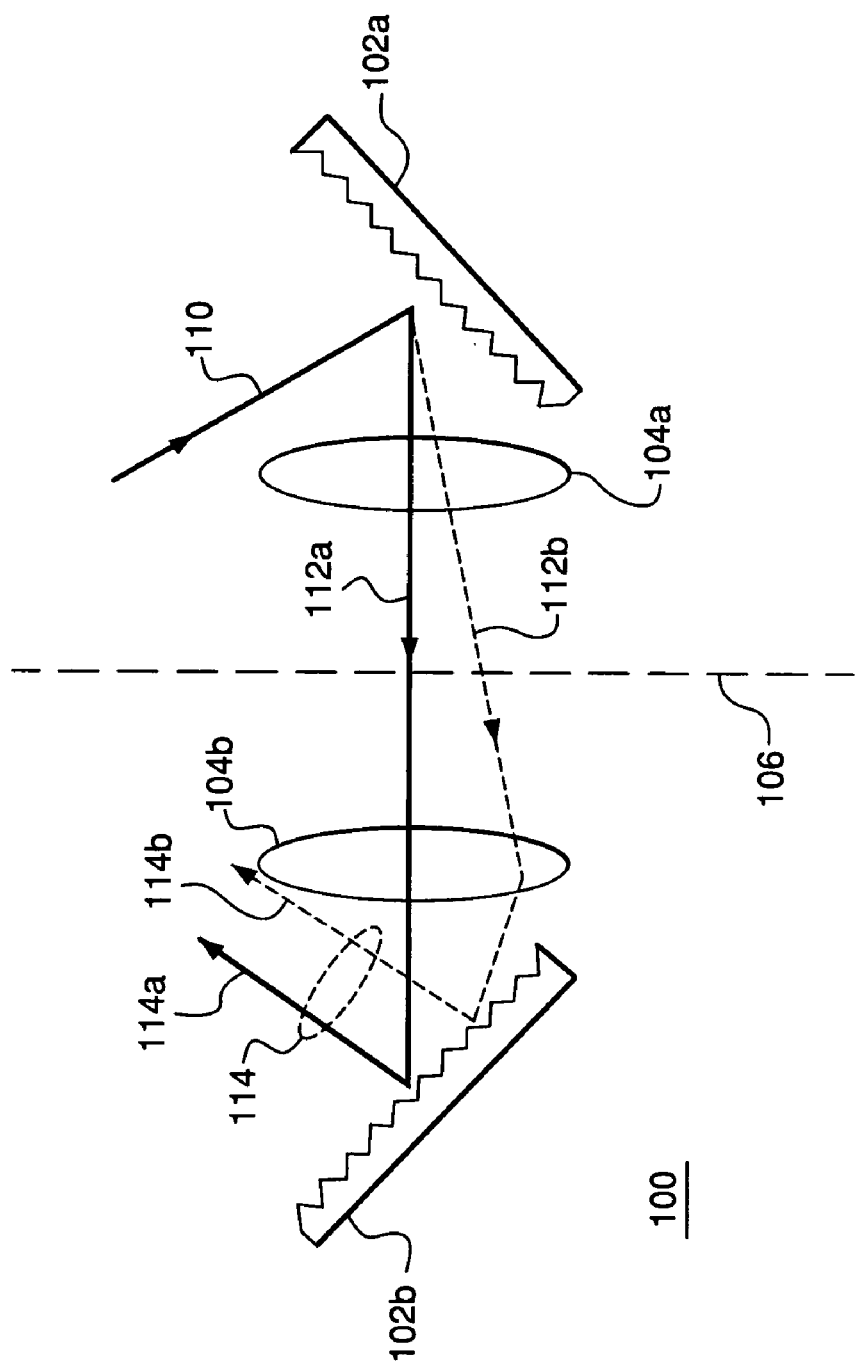
FIG. 1 schematically shows a prior art dispersion compensator.

FIG. 1 schematically illustrates a prior art dispersion compensator 100 that can be used to reduce the effects of chromatic dispersion in an optical communication system. An optical signal 110 corresponding to one or more channels of an optical communication link (not shown) is diffracted by a first diffraction grating 102a to form a plurality of beams, two of which, beams 112a and 112b, are shown in FIG. 1. Beam 112a corresponds to relatively short wavelengths of signal 110, while beam 112b corresponds to relatively long wavelengths of that signal. Beams 112a–b traverse lenses 104a–b, positioned such that they share a focal point, and impinge upon a second diffraction grating 102b that forms a beam 114 including beams 114a and 114b corresponding to beams 112a and 112b, respectively. Beam 114 is then coupled into an output optical fiber (not shown) to generate a processed optical signal corresponding to signal 110. Compensator 100 can be designed such that different spectral components of signal 110 travel different distances in the compensator and thereby acquire relative delays that can be used to reduce the effects of chromatic dispersion in the communication link.

In an alternative implementation, compensator 100 may be "folded", as known in the art, by utilizing a symmetry plane 106 present in that compensator. More specifically, one can place a mirror at plane 106 to reflect beams 112a–b back toward lens 104a and grating 102a. Since, after the reflection, lens 104a and grating 102a will perform on beams 112a–b processing that is essentially identical to that of lens 104b and grating 102b, the latter two can be removed from the resulting folded system thereby reducing the number of required optical components. More details on compensator 100 of FIG. 1 and its various modifications can be found in U.S. Pat. Nos. 6,481,861 and 6,296,361, the teachings of both of which are incorporated herein by reference.

One problem with compensator 100 is that it induces optical signal losses that are non-uniform across an optical communication channel. More specifically, due to different insertion and coupling losses corresponding to different portions of beam 114, the transmission of compensator 100 may vary by as much as about 5 dB over the 0.5-nm bandwidth of a typical communication channel. This variation may result in optical-pulse distortions and cause errors at the receiver.

Another problem with compensator 100 is its physical size. More specifically, to compensate for a typical amount of chromatic dispersion occurring in an optical communication link, gratings 102a–b have to be relatively large (e.g., about 0.1 m) and be separated by a relatively large distance (e.g., about 1 meter) thereby making the use of compensator 100 impractical for many communication systems.

The size of compensator 100 can be reduced by the use of high-order echelle gratings as described in the above cited U.S. Pat. Nos. 6,481,861 and 6,296,361. However, this creates yet another problem with compensator 100 related to processing multi-channel signals. For example, for a wavelength division multiplexing (WDM) signal 110, compensator 100 configured with echelle gratings will apply the same group delay value to each WDM component of that signal. However, since chromatic dispersion typically varies between WDM channels, such compensator 100 may work relatively well for some channels while providing unsatisfactory CD compensation for other channels.

Figure 2:
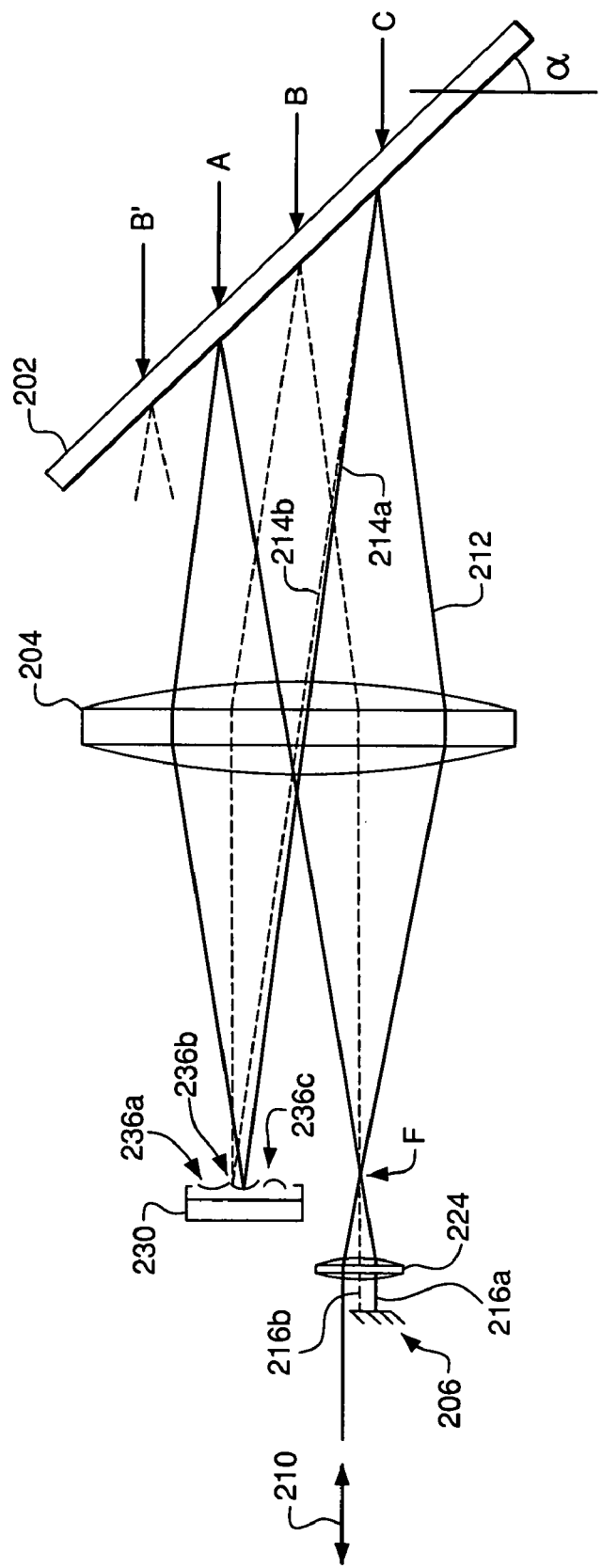
FIG. 2 schematically shows a dispersion compensator according to one embodiment of the present invention.

FIG. 2 schematically illustrates a dispersion compensator 200 according to one embodiment of the present invention. Compensator 200 comprises a diffraction grating 202, two lenses 204 and 224, a flat mirror 206, and an array 230 of mirrors 236, three of which, mirrors 236a–c, are illustratively shown in FIG. 2. Each mirror 236 may be a fixed mirror or a configurable mirror as will be described in more detail below. Compensator 200 is a "folded" system using mirror 206 to reduce the number of optical components in the compensator. An optical signal 210 applied to compensator 200 undergoes four diffractions by grating 202 before a corresponding processed optical signal is generated.

Signal 210 may be pre-processed as necessary before it enters compensator 200. For example, signal 210 is preferably appropriately collimated after it exits an optical fiber (not shown). In addition, signal 210 may be processed for polarization diversity to reduce possible polarization dependence of compensator 200. In particular, a combination of a birefringent element and a half-wave plate may be used, as known in the art, to convert non-polarized light into linearly polarized light as it enters compensator 200. The same combination may then be used to undo the polarization conversion when light exits the compensator. The incoming and outgoing signals for compensator 200 may be separated, as known in the art, using a directional coupler, e.g., an optical circulator.

Lens 224 and mirror array 230 are positioned with respect to lens 204 such that (i) focal point F of lens 224 and (ii) mirrors 236 of array 230 lie substantially in a focal plane of lens 204. Signal 210 corresponding to one or more optical channels of an optical communication link (not shown) is directed by lenses 224 and 204 along the optical path indicated in FIG. 2 by beam 212, strikes grating 202 at point C, and is diffracted by the grating to form a plurality of beams, two of which, beams 214a and 214b, corresponding to the same communication channel are shown in FIG. 2, where beam 214a corresponds to shorter wavelengths than beam 214b. Beams (not shown) corresponding to other communication channels are similarly formed. Beams 214a–b as well as other diffracted beams are directed by lens 204 to mirror array 230. Dispersion characteristics and the tilt angle (α) of grating 202 and the size and position of mirrors 236 of mirror array 230 are chosen such that light corresponding to different communication channels is received by different mirrors of the array. For example, mirror 236a receives light (not shown) corresponding to a first communication channel, mirror 236b receives light indicated by beams 214a–b corresponding to a second communication channel, etc.

In one implementation of compensator 200, each mirror 236 of mirror array 230 is a fixed mirror that is either flat or curved. The curvature of each mirror can be positive, as for mirrors 236a–b in FIG. 2, or negative, as for mirror 236c in FIG. 2. Note that zero curvature corresponds to a flat mirror.

In other implementations of compensator 200, mirror array 230 is a device, in which one or more (e.g., all) mirrors 236 are adjustable (tunable) mirrors. For example, each mirror 236 may be a thermally controlled, variable-curvature mirror. More specifically, each mirror 236 may include at least two layers of different materials, e.g., a silicon layer and a metal layer formed over the silicon layer, the layers having different (mismatched) thermal expansion characteristics. As a result of the mismatch, change in the mirror temperature produces thermal stresses in the layers and thereby causes mirror 236 to deform. Depending on the temperature, mirror 236 may deform to have a positive or negative curvature, or be flat. A representative curvature range for variable-curvature mirrors 236 of array 230 may be from about −4 $mm^{-1}$ to about +4 $mm^{-1}$, where curvature is quantified as a reciprocal curvature radius.

Alternatively, each adjustable mirror 236 of mirror array 230 may be implemented as a segmented MEMS mirror, in which tilt angle of each segment is controlled electrostatically. By separately adjusting the tilt of each segment, each segmented mirror 236 can be configured to redirect light similar to the above-described variable-curvature mirror. As will be appreciated by one skilled in the art, different implementations of mirror array 230 may be used in compensator 200 without departing from the scope and principle of the present invention.

The following describes light processing in compensator 200 for the communication channel represented in FIG. 2 by beams 214a–b. Illustratively, beams 214a and 214b correspond to center and edge wavelengths, respectively, of that channel. Beam 214a strikes a center portion of mirror 236b, is reflected by the mirror, traverses lens 204, strikes grating 202 at point A, is reflected by the grating, traverses lenses 204 and 224, and strikes flat mirror 206. Similarly, beam 214b strikes an edge portion of mirror 236b, is reflected by the mirror, traverses lens 204, strikes grating 202 at point B, is reflected by the grating, traverses lenses 204 and 224, and strikes flat mirror 206. In FIG. 2, the beams striking mirror 206 and corresponding to beams 214a–b are labeled as beams 216a–b, respectively. Upon reflection from mirror 206, beams 216a–b retrace the above-indicated respective paths in the opposite direction to point C on grating 202, where they are recombined into beam 212 that traverses lenses 204 and 224 and is output from compensator 200. Note that, during propagation through compensator 200, the signal undergoes four diffractions by grating 202.

The relative delay acquired by beams 214a and 214b in compensator 200 is a function of separation between points A and B on grating 202, which separation is determined by the curvature of mirror 236b. For example, assuming that the center portion of mirror 236b is coplanar with the focal plane of lens 204, reducing the curvature of mirror 236b from the value indicated in FIG. 2 will move point B toward point A. Furthermore, if the curvature sign for mirror 236b is changed from positive to negative, point B will pass point A and move toward the position indicated in FIG. 2 by point B'. Therefore, using compensator 200, one can generate desired group delay for a communication channel by selecting the curvature of the corresponding mirror 236. In addition, the delay value can be varied dynamically, for example, using adjustable mirrors 236, to correspond to the current amount of chromatic dispersion in the communication channel.

As will be further illustrated below, for each communication channel, compensator 200 has relatively uniform (flat) transmission characteristics over the channel bandwidth compared to the corresponding characteristics of prior art compensator 100 (FIG. 1). This improvement is associated with novel signal processing implemented in compensator 200. For example, for a selected communication channel, compensator 200 (FIG. 2) processes an optical signal corresponding to that channel by (i) spectrally decomposing the signal into the corresponding beams (e.g., beams 214a–b), (ii) routing the beams along different optical paths (e.g., from point C to mirror 206 and back to point C) to variously delay the beams, and (iii) recombining the delayed beams spatially and directionally (e.g., into beam 212) to generate a processed optical signal. This processing is different from the processing implemented, for example, in prior art compensator 100 in that beams 114a and 114b of beam 114 will be either spatially separated, as shown in FIG. 1, or directionally diverse, if a fiber coupling lens is used at the compensator output. Spatial and directional recombination of beams 214a–b is enabled in compensator 200 by two additional grating diffractions realized in that compensator over the two diffractions realized in compensator 100 and its folded equivalents.

In addition, the increased effective signal propagation length in compensator 200 results in increased group delay generating capacity compared to that of compensator 100. More specifically, compensator 200 generates about four times the delay generated by "folded" compensator 100 having a comparable size. Therefore, to obtain a specified group delay value, one can use compensator 200 of a smaller size than compensator 100. Alternatively, one can use compensator 200 instead of compensator 100 to increase the generated group delay value while maintaining the same compensator size.

Furthermore, compensator 200 enables channel-specific dispersion handling that is not possible with compensator 100. More specifically, the relative dispersion inefficiency of compensator 100 typically forces a grating configuration, in which each grating 102 (e.g., an echelle grating) operates in a relatively high (e.g., greater than 500-th) diffraction order. As a result, beams corresponding to different communication channels in compensator 100 do not acquire sufficient spatial separation in the transverse direction to permit independent routing of those beams and thereby possibly producing different group delays for the corresponding different channels. In contrast, relatively high dispersion efficiency of compensator 200 allows grating 202 to be configured to operate in a first diffraction order. As a result, beams corresponding to different communication channels acquire relatively large transverse separation, which is utilized in compensator 200 by employing mirror array 230 having different mirrors 236 for different communication channels. Since different mirrors 236 can have different (selected) curvatures, different group delays for different communication channels can be generated using compensator 200. In addition, for each channel, the group delay value can be adjusted as necessary by tuning the corresponding mirror 236, for example, as described above. Thus, using certain embodiments of compensator 200, for each communication channel, group delay can be selected and/or varied independent of other communication channels.

Figure 4:
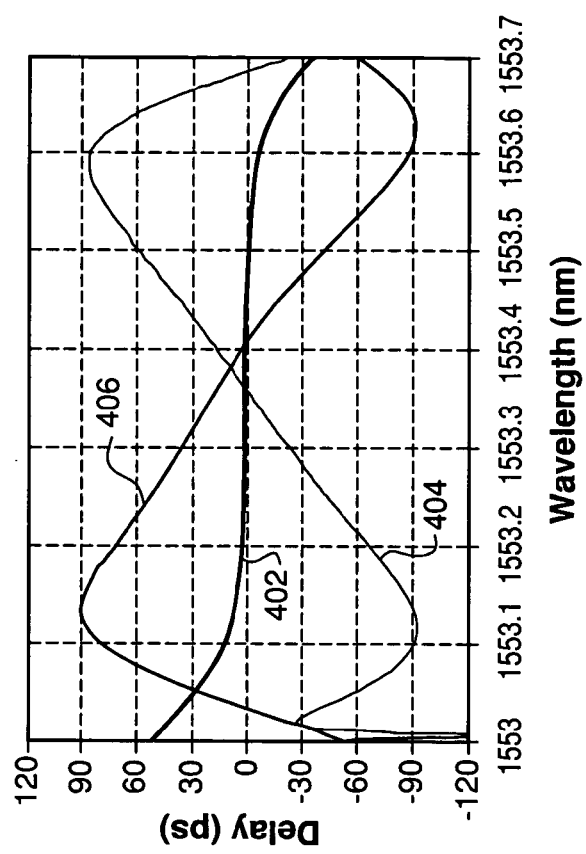
FIGS. 3 and 4 graphically illustrate representative characteristics of the compensator of FIG. 2 in a spectral region corresponding to one communication channel.
Figure 3:
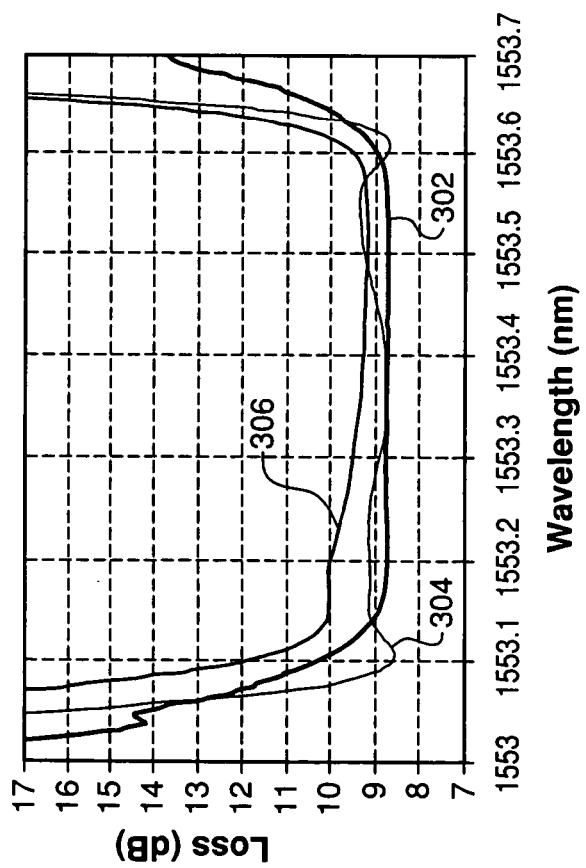

FIGS. 3 and 4 graphically illustrate representative characteristics of compensator 200 in a spectral region corresponding to one communication channel. More specifically, FIGS. 3 and 4 show the attenuation and delay, respectively, for compensator 200 as a function of curvature of the corresponding mirror 236, where the curves with labels having the same last two digits correspond to the same curvature. In particular, curves '02, '04, and '06 correspond to the curvatures of 0, −3.8, and 3.8 mm$^{-1}$, respectively. As can be seen in FIGS. 3 and 4, for each represented curvature, the transmission is flat to within at most ±0.4 dB for a 0.46 nm (58 GHz) channel bandwidth, while group delay values between about −400 and +400 ps/nm are achieved.

Figure 6:
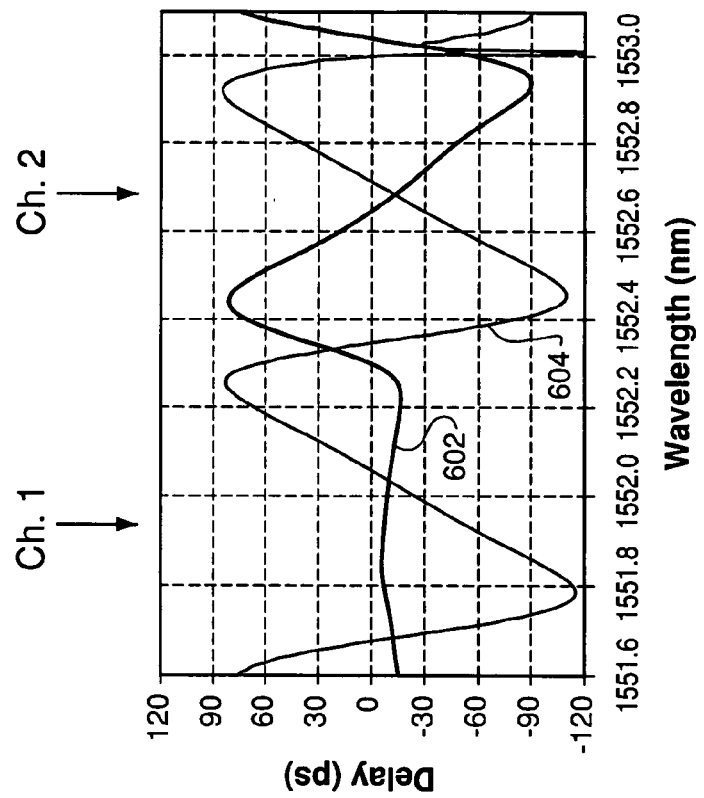
FIGS. 5 and 6 graphically illustrate representative characteristics of the compensator of FIG. 2 in a spectral region corresponding to two adjacent communication channels.
Figure 5:
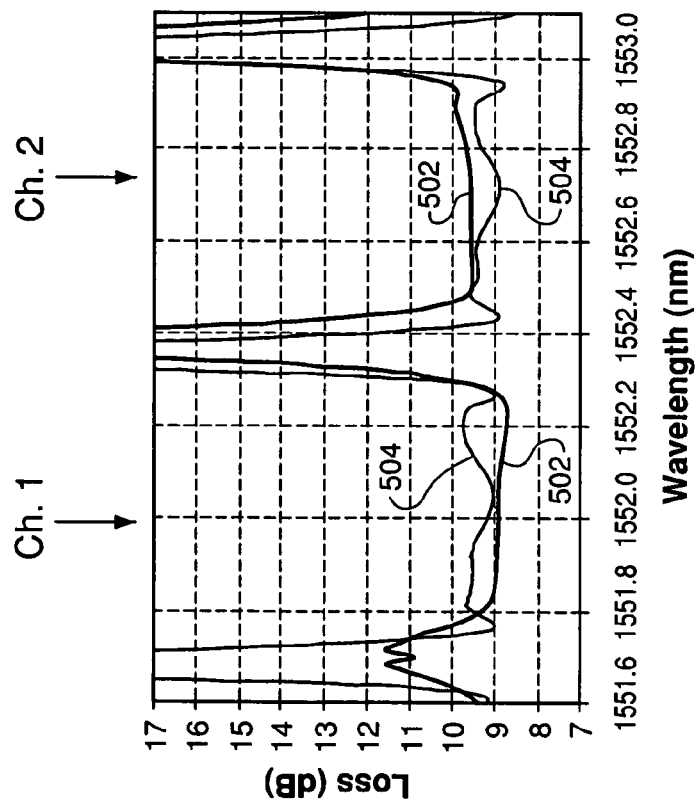

FIGS. 5 and 6 graphically illustrate representative characteristics of compensator 200 in a spectral region corresponding to two adjacent communication channels (labeled 1 and 2). More specifically, FIGS. 5 and 6 show the attenuation and delay, respectively, for compensator 200 as a function of curvatures of two corresponding mirrors 236. In particular, curves 502 and 602 correspond to the curvatures of 0 mm$^{-1}$ (channel 1) and 3.8 mm$^{-1}$ (channel 2), while curves 504 and 604 correspond to the curvatures of −3.8 mm$^{-1}$ (channel 1) and −3.8 mm$^{-1}$ (channel 2). As indicated by FIGS. 5 and 6, compensator 200 is capable of generating different group delays for different channels while maintaining a substantially flat transmission profile over the channel bandwidth of about 0.5 nm for each of those channels.

Figure 7:
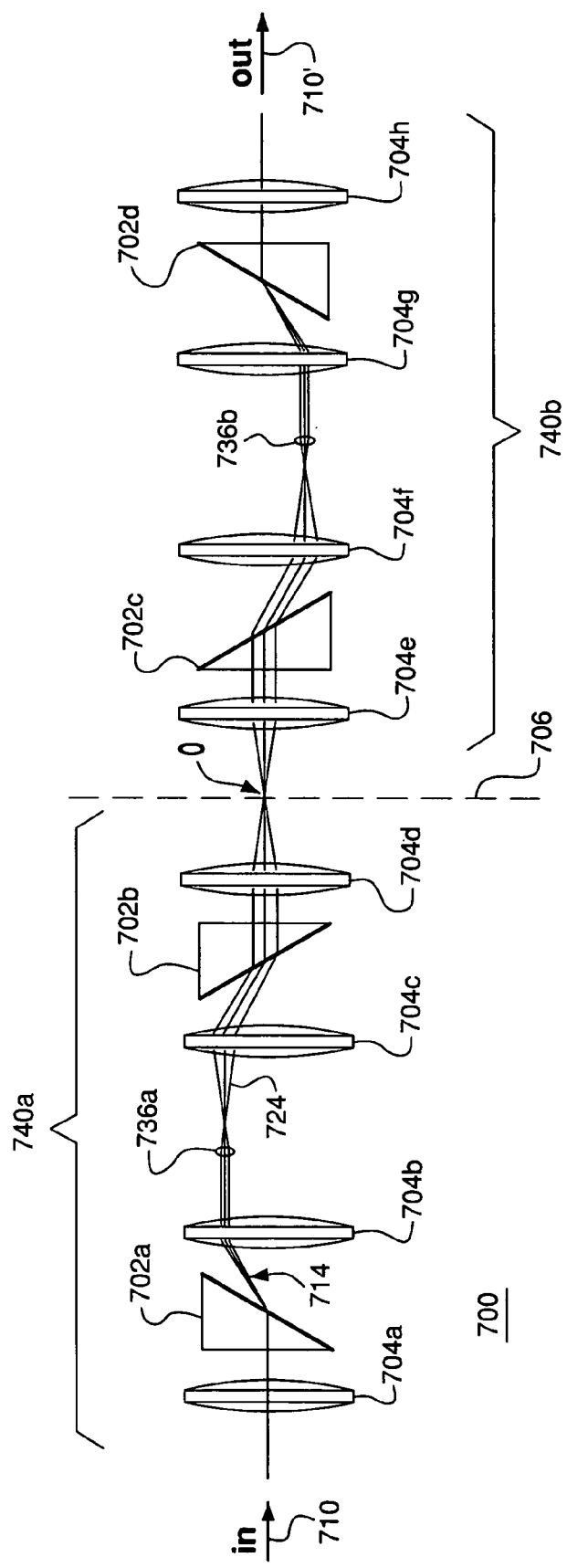
FIG. 7 schematically shows a dispersion compensator according to another embodiment of the present invention.

FIG. 7 schematically shows a dispersion compensator 700 according to another embodiment of the present invention. Compensator 700 is designed to operate in transmission and is a fully unfolded optical system analogous to compensator 200 of FIG. 2. More specifically, compensator 700 includes two equivalent sections 740a–b. Each section 740 includes two prism-buried diffraction gratings 702, each analogous to grating 202 of compensator 200, four lenses 704, each analogous to lens 204 of compensator 200, and a lens 736. Each lens 736 may be a variable focal-length lens functionally analogous, for example, to adjustable mirror 236b of compensator 200. Description of variable focal-length lenses can be found, for example, in T. Krupenkin, S. Yang, and P. Mach, "*Tunable Liquid Microlens*," *Applied Physics Letters*, v. 82 (3): pp. 316–318, Jan. 20, 2003, the teachings of which are incorporated herein by reference.

Signal 710 applied to compensator 700 is received by section 740a, where it is relayed by lens 704a to grating 702a and is diffracted by the grating to form a plurality of beams 714 corresponding to different wavelengths of signal 710. Beams 714 are redirected by lens 704b to lens 736a that forms a cone 724 of light received by lens 704c and further directed to grating 702b. The angle of cone 724 and therefore the size of the corresponding light spot on grating 702b depend on the focal length of lens 736a. Light diffracted by grating 702b is imaged by lens 704d onto point O, a symmetry point for compensator 700. Light emanating from point O is received by section 740b, which performs light processing similar to that of section 740a, but in the reverse order, to generate a processed signal 710' corresponding to signal 710 that is then output from compensator 700. Similar to compensator 200 of FIG. 2, where the generated group delay value is determined by the magnification strength (i.e., curvature) of the corresponding mirror 236, the group delay value generated by compensator 700 is determined by the magnification strength (i.e., reciprocal focal length) of lenses 736a–b. More specifically, the greater the magnification strength, the greater the group delay.

In one embodiment, each of lenses 736a–b in compensator 700 is part of a corresponding lens array (not shown)

functionally analogous to mirror array 230 of compensator 200. Accordingly, dispersion characteristics of gratings 702 and the size and position of lenses 736 of each corresponding lens array in compensator 700 are chosen such that light corresponding to different communication channels is received by different lenses 736 of the lens array. As a result, compensator 700 can be configured to generate different desired group delays for different communication channels.

Figure 8:
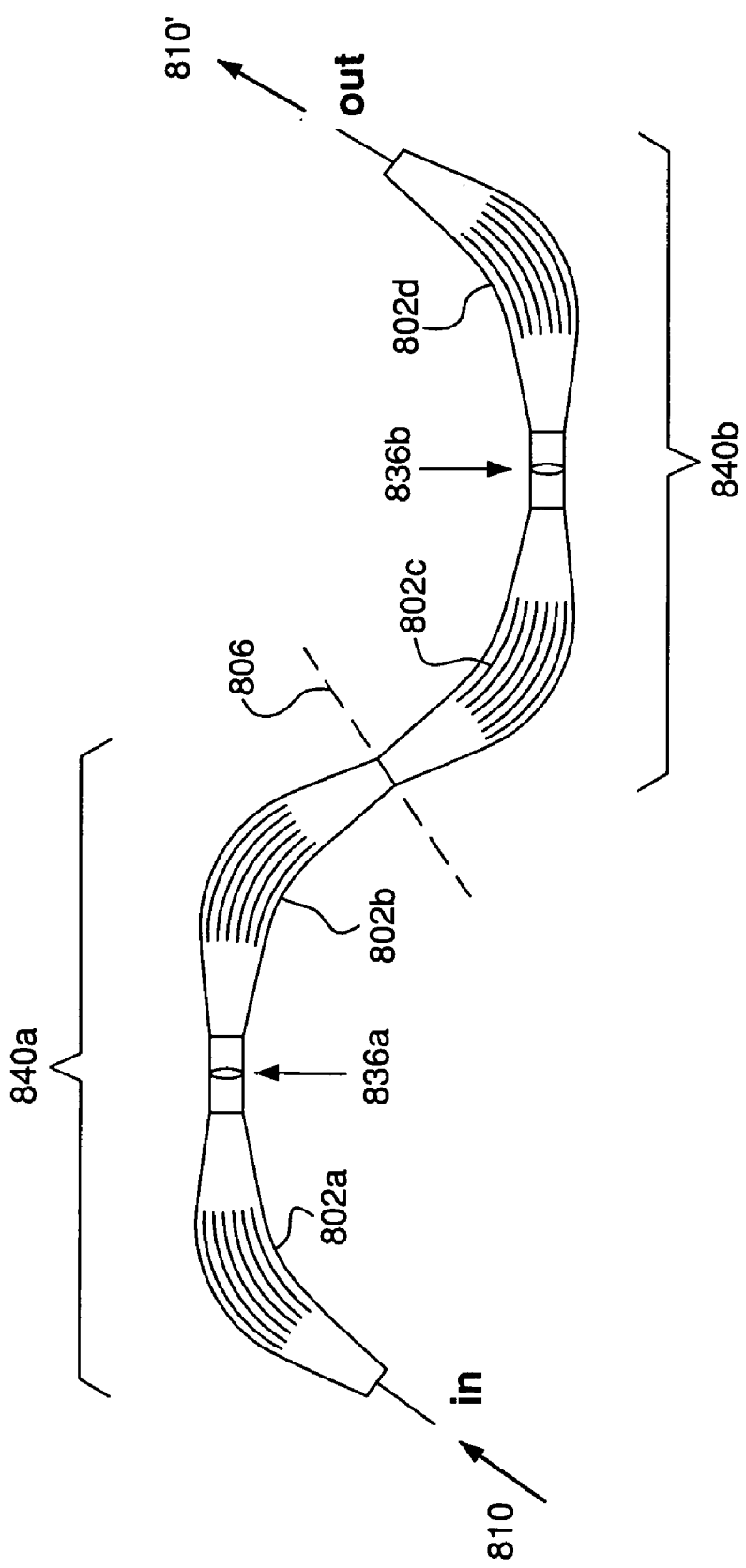
FIG. 8 schematically shows a dispersion compensator according to yet another embodiment of the present invention.

FIG. 8 schematically shows a dispersion compensator 800 according to yet another embodiment of the present invention. Compensator 800 is a waveguide device analogous to compensator 700 of FIG. 7. More specifically, compensator 800 includes two equivalent sections 840a–b, analogous to sections 740a–b, respectively, of compensator 700. Each section 840 includes two arrayed waveguide gratings (AWGs) 802 and a tunable lens 836. Each lens 836 may be, for example, a thermally controlled waveguide lens whose focal length is determined by a temperature gradient generated in the corresponding waveguide. Description of tunable waveguide lenses can be found, for example, in C. R. Doerr, L. W. Stolz, S. Chandrasekhar, L. Buhl, and R. Pafchek, "Multichannel Integrated Tunable Dispersion Compensator Employing a Thermooptic Lens," Optical Fiber Communication Conference and Exhibit, 2002 (OFC 2002), Mar. 17–22, 2002: pp. 823–825, the teachings of which are incorporated herein by reference.

Signal 810 applied to compensator 800 is received by section 840a, where it is spectrally decomposed by AWG 802a and directed by lens 836a onto AWG 802b. The light then passes through AWG 802b and is imaged at plane 806 at the junction of sections 840a–b. Section 840b performs light processing similar to that of section 840a, but in the reverse order, to generate a processed signal 810' that is output from compensator 800. Similar to compensator 700 of FIG. 7, group delay generated in compensator 800 is primarily determined by the magnification strength of lenses 836a–b that determines the spread of the signal spectrum at AWGs 802b–c, which spread controls selection of waveguides in those AWGs through which the signal is propagated. For example, for a relatively broadly spread signal spectrum (high magnification strength), a relatively large group delay value will be produced due to the relatively large length difference for the corresponding waveguides, and vice versa.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims. For example, as readily recognized by one skilled in the art, compensator 200 (FIG. 2) may be embodied in an unfolded device, in which an additional section (comprising similarly arranged grating 202, lenses 204 and 224, and mirror array 230) is added while mirror 206 is removed from the resulting device. Similarly, compensator 700 (FIG. 7) may be embodied as a folded device, in which a mirror is placed at plane 706 to direct light back into section 740a while section 740b is removed from the resulting device. Dispersion compensators of the present invention may be designed to operate in transmission and/or reflection and be implemented using free-space optics or waveguide optics or a suitable combination thereof. The present invention may be practiced in optical communication systems operating at different bit rates and transmitting optical signals using light of different wavelengths.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

I claim:

1. A dispersion compensator, comprising a diffraction grating optically coupled to a light-routing device, wherein:
   the light-routing device is configured to direct light corresponding to an optical input signal to the diffraction grating such that the light is subjected to four diffractions by the diffraction grating;
   the diffraction grating is configured to spectrally decompose the optical input signal into a plurality of optical components;
   the diffraction grating and the light-routing device are configured to direct different optical components along different paths to generate relative delays between the components; and
   the diffraction grating is further configured to spatially recombine the delayed components to generate a processed optical signal
   the light-routing device includes first and second mirrors, wherein:
      the diffraction grating decomposes the optical input signal into the plurality of optical components and directs the optical components to the first mirror, thereby performing a first diffraction;
      the first mirror receives the optical components after the first diffraction and reflects the optical components toward the diffraction grating to perform a second diffraction;
      in performing the second diffraction, the diffraction grating directs the optical components to the second mirror;
      the second mirror receives the optical components after the second diffraction and reflects the optical components toward the diffraction grating to perform a third diffraction;
      in performing the third diffraction, the diffraction grating directs the optical components to the first mirror;
      the first mirror receives the optical components after the third diffraction and reflects the optical components toward the diffraction grating to perform a fourth diffraction; and
      during the fourth diffraction, the diffraction grating spatially recombines the optical components received from the first mirror to generate the processed optical signal.

2. The dispersion compensator of claim 1, wherein the diffraction grating recombines the delayed components directionally.

3. The dispersion compensator of claim 1, wherein the first mirror is a fixed flat or curved mirror.

4. The dispersion compensator of claim 1, wherein the first mirror is an adjustable variable-curvature mirror.

5. The dispersion compensator of claim 1, wherein:
   the optical input signal corresponds to a plurality of communication channels; and
   the first mirror receives light corresponding to substantially one communication channel.

6. The dispersion compensator of claim 5, comprising a plurality of mirrors, wherein:
   the first mirror is one of the mirrors in the plurality of mirrors; and
   each mirror of the plurality of mirrors receives light corresponding to a communication channel different from the communication channel processed by any other mirror of the plurality of mirrors.

7. The dispersion compensator of claim 1, wherein the first mirror comprises a continuous mirror having an adjustable shape, wherein the mirror's shape affects the paths of the optical components, thereby affecting the generated relative delays.

8. The dispersion compensator of claim 7, wherein the continuous mirror is adapted to deform to have a desired curvature value.

9. The dispersion compensator of claim 8, wherein the desired curvature value is selectable from a curvature range bound by a negative curvature value and a positive curvature value.

10. A method of processing an optical signal, comprising:
directing light corresponding to an optical input signal to a diffraction grating using a light-routing device such that the light is subjected to four diffractions by the diffraction grating;
spectrally decomposing the optical input signal into a plurality of optical components using the diffraction grating;
directing different optical components along different paths using the diffraction grating and the light-routing device to generate relative delays between the components; and
spatially recombining the delayed components using the diffraction grating to generate a processed optical signal, wherein the light-routing device includes first and second mirrors, wherein:
the diffraction grating decomposes the optical input signal into the plurality of optical components and directs the optical components to the first mirror, thereby performing a first diffraction;
the first mirror receives the optical components after the first diffraction and reflects the optical components toward the diffraction grating to perform a second diffraction;
in performing the second diffraction, the diffraction grating directs the optical components to the second mirror;
the second mirror receives the optical components after the second diffraction and reflects the optical components toward the diffraction grating to perform a third diffraction;
in performing the third diffraction, the diffraction grating directs the optical components to the first mirror;
the first mirror receives the optical components after the third diffraction and reflects the optical components toward the diffraction grating to perform a fourth diffraction; and
during the fourth diffraction, the diffraction grating spatially recombines the optical components received from the first mirror to generate the processed optical signal.

11. The method of claim 10, wherein the spatially recombining the delayed components comprises recombining the delayed components directionally.

12. The method of claim 10, wherein the relative delays compensate for chromatic dispersion of the optical input signal.

13. The method of claim 10, further comprising changing the different paths to change the relative delays.

14. The method of claim 10, wherein:
the optical input signal includes a plurality of sub-signals, each sub-signal corresponding to a respective communication channel; and
the relative delays generated for optical components of each sub-signal correspond to a group delay of the respective communication channel.

15. The method of claim 14, wherein at least two group delays have different values.

16. The method of claim 10, wherein the first mirror comprises a continuous mirror having an adjustable shape, wherein the mirror's shape affects the paths of the optical components, thereby affecting the generated relative delays.

17. The method of claim 16, wherein the continuous mirror is adapted to deform to have a desired curvature value.

18. The method of claim 17, further comprising selecting the desired curvature value from a curvature range bound by a negative curvature value and a positive curvature value.

19. A dispersion compensator, comprising:
means for spectrally decomposing light corresponding to an optical input signal into a plurality of optical components, said means for spectrally decomposing including a diffraction grating;
means for directing different optical components along different paths to generate relative delays between the components; and
means for spatially recombining the delayed components to generate a processed optical signal, said means for recombining including the diffraction grating, wherein:
the means for directing includes first and second mirrors and is configured to direct the light to the diffraction grating such that the light is subjected to four diffractions by the diffraction grating;
the diffraction grating decomposes the optical input signal into the plurality of optical components and directs the optical components to the first mirror, thereby performing a first diffraction;
the first mirror receives the optical components after the first diffraction and reflects the optical components toward the diffraction grating to perform a second diffraction;
in performing the second diffraction, the diffraction grating directs the optical components to the second mirror;
the second mirror receives the optical components after the second diffraction and reflects the optical components toward the diffraction grating to perform a third diffraction;
in performing the third diffraction, the diffraction grating directs the optical components to the first mirror;
the first mirror receives the optical components after the third diffraction and reflects the optical components toward the diffraction grating to perform a fourth diffraction; and
during the fourth diffraction, the diffraction grating spatially recombines the optical components received from the first mirror to generate the processed optical signal.

20. The dispersion compensator of claim 19, wherein the first mirror comprises a continuous mirror having an adjustable shape, wherein the mirror's shape affects the paths of the optical components, thereby affecting the generated relative delays.

21. The dispersion compensator of claim 20, wherein the continuous mirror is adapted to deform to have a desired curvature value.

22. The dispersion compensator of claim 21, further comprising means for selecting the desired curvature value from a curvature range bound by a negative curvature value and a positive curvature value.

* * * * *